Figure 1:
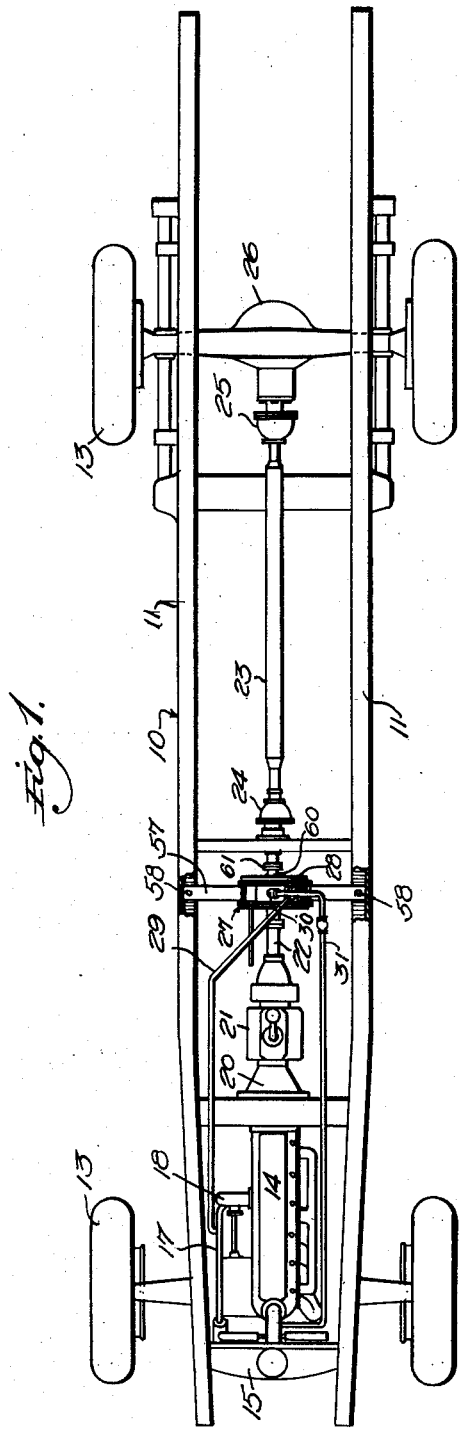

Aug. 22, 1939.  R. G. DE LA MATER  2,170,128

BRAKE MECHANISM FOR MOTOR VEHICLES

Filed May 12, 1936  4 Sheets-Sheet 1

Inventor
ROBERT G. DELAMATER

By
Attorney

Aug. 22, 1939.   R. G. DE LA MATER   2,170,128
BRAKE MECHANISM FOR MOTOR VEHICLES
Filed May 12, 1936   4 Sheets-Sheet 2

Inventor
ROBERT G. DELAMATER
Attorney

Aug. 22, 1939.   R. G. DE LA MATER   2,170,128
BRAKE MECHANISM FOR MOTOR VEHICLES
Filed May 12, 1936      4 Sheets-Sheet 3
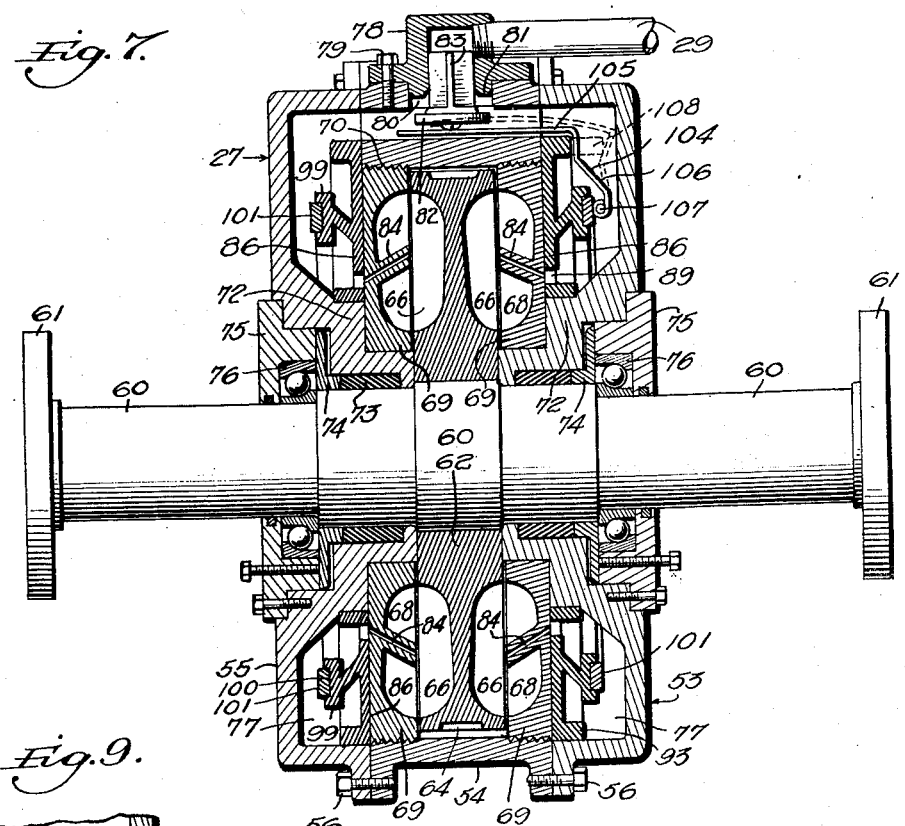
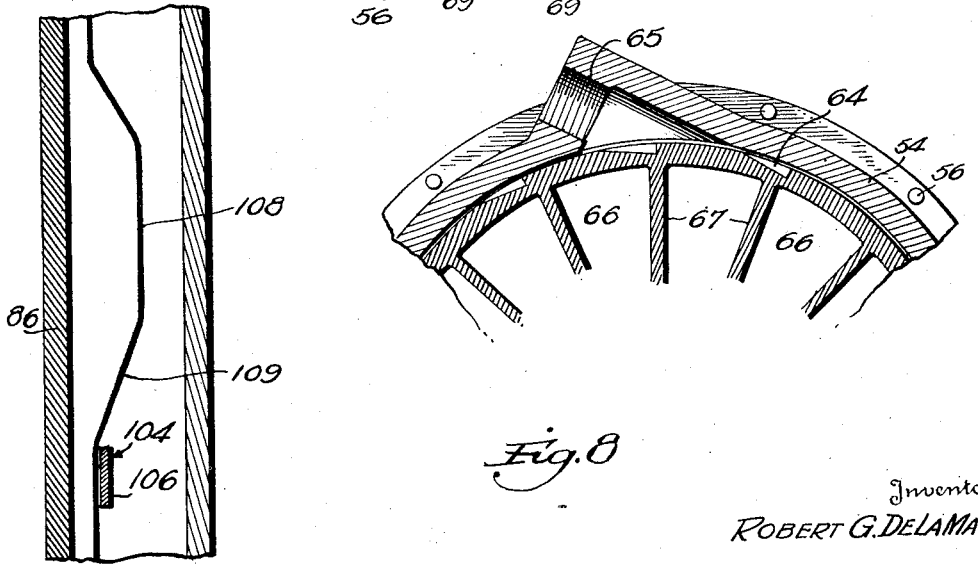
Inventor
ROBERT G. DELAMATER
By C. L. Barker
Attorney

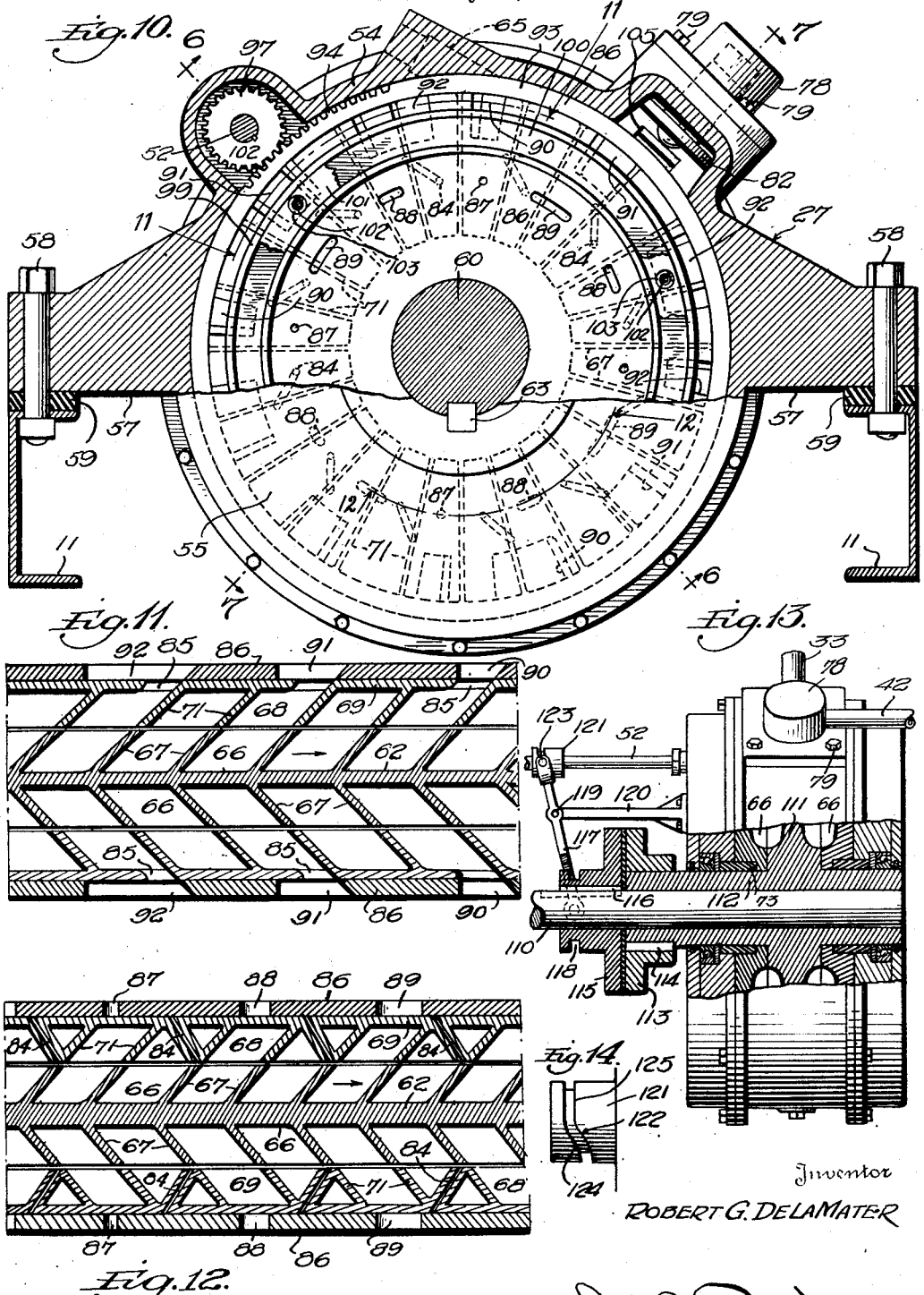

Patented Aug. 22, 1939

2,170,128

UNITED STATES PATENT OFFICE 2,170,128

BRAKE MECHANISM FOR MOTOR VEHICLES

Robert Griffin De La Mater, Parkersburg, W. Va., assignor to The Parkersburg Rig & Reel Company, Parkersburg, W. Va., a corporation of West Virginia Application May 12, 1936, Serial No. 79,377

34 Claims. (Cl. 188—90)

This invention relates to brake mechanisms for motor vehicles and more particularly to the combination of a hydrodynamic brake with a motor vehicle for the purpose of controlling and limiting the speed of the vehicle.

In my copending applications Serial Nos. 61,231, filed January 28, 1936, and 63,240, filed February 10, 1936, I have shown several types of hydrodynamic brake mechanisms which are adapted for various uses where it is desired to control and limit the speed of rotating parts. For example, such mechanisms are adapted for use with oil well drilling equipment, but are particularly intended for use as supplemental brake mechanisms for controlling and limiting the speed of motor vehicles. The brake mechanisms are particularly adapted for the latter use because of their flexibility of control, and are highly advantageous in use with heavy trucks and buses for limiting the speed of such vehicles when descending long grades. In such use, the hydrodynamic brakes referred to are not intended to stop the vehicle, but eliminate the necessity of having to employ the conventional friction brakes when descending long grades, thus providing a greater degree of safety and greatly improved control by eliminating the wear on the conventional vehicle brakes.

An important object of the present invention is to provide a novel combination of a hydrodynamic brake mechanism with a motor vehicle for controlling and limiting the speed of the vehicle.

A further object is to provide an apparatus of the character referred to which is under constant control by the operator to permit any degree of braking action to be obtained between zero and a predetermined maximum.

A further object is to provide novel means for facilitating the complete evacuation of the hydrodynamic brake to prevent the latter from generating any braking action.

A further object is to provide novel means for synchronizing the controlling of the braking action with the means for evacuating the brake.

A further object is to utilize the pump of the vehicle cooling system for assisting in evacuating the brake.

A further object is to provide common means for controlling the braking action and for connecting the hydrodynamic brake to the rotating part with which it is associated and to disconnect it therefrom.

Other objects and advantages of the invention will become apparent during the course of the following description.

In the drawings I have shown several embodiments of the invention. In this showing—

Figure 2:
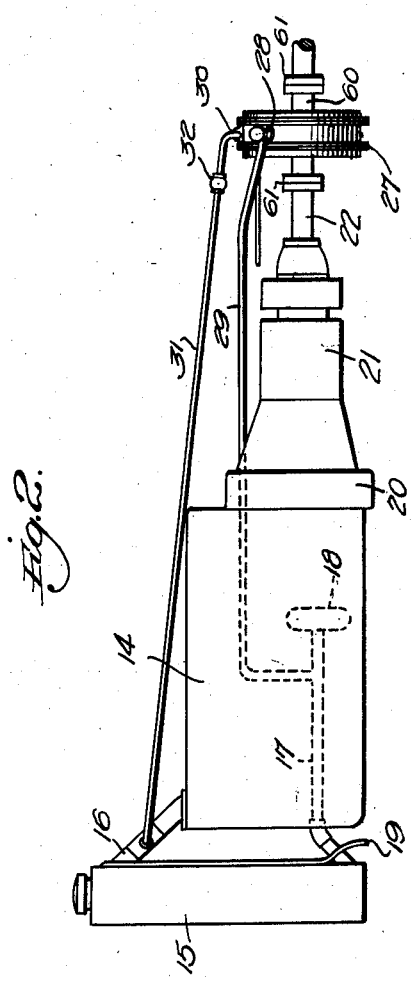
Figure 3:
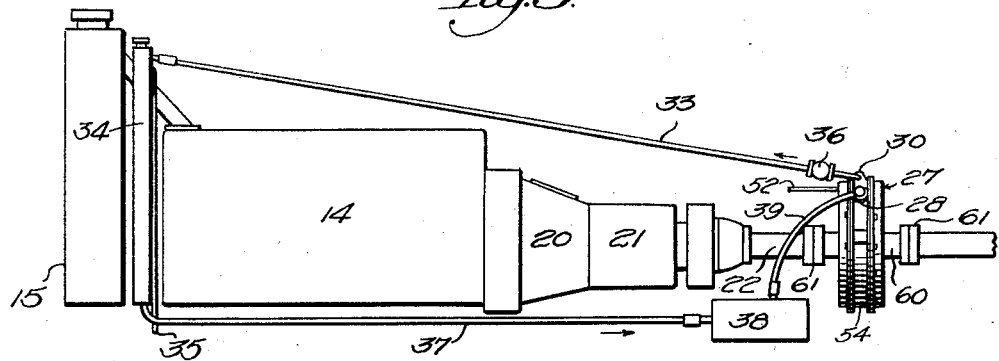
Figure 4:
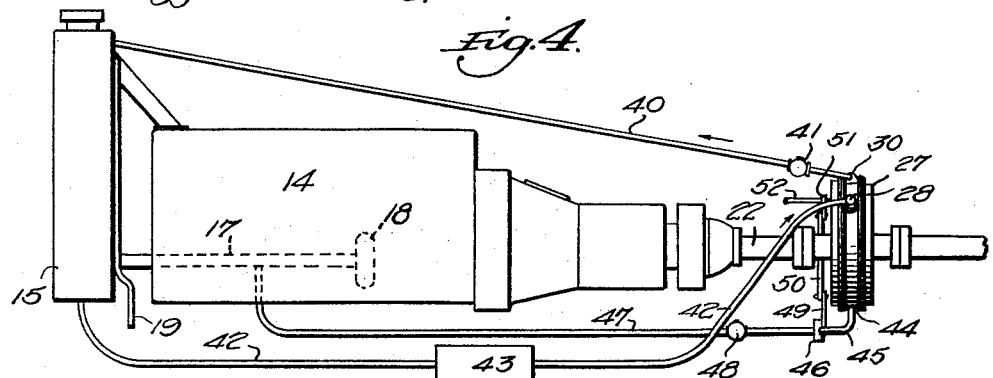
Figures 5, 6:
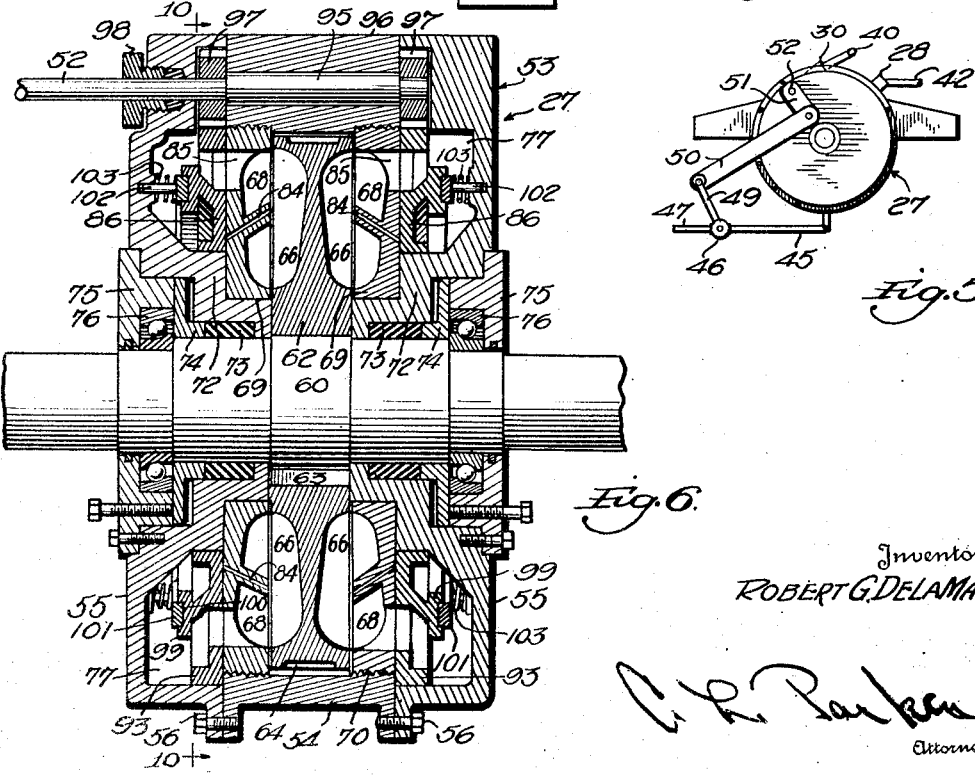

Figure 1 is a plan view of a motor vehicle chassis showing the invention applied, Figure 2 is a side elevation of a motor vehicle power plant and associated elements showing the same form of the invention, Figure 3 is a similar view showing a modified form of installation, Figure 4 is a similar view showing a further modified type of installation, Figure 5 is a side elevation of the hydrodynamic brake showing a portion of the control mechanism therefor, Figure 6 is an axial sectional view through the dynamic brake taken substantially on line 6—6 of Figure 10, Figure 7 is a similar view on line 7—7 of Figure 10, Figure 8 is a fragmentary detail sectional view indicating the fluid outlet connection, Figure 9 is a detail fragmentary view of a valve operating cam, Figure 10 is a transverse sectional view through the brake mechanism taken substantially on line 10—10 of Figure 6, parts being shown in elevation, and parts being broken away, Figure 11 is a sectional view taken as indicated substantially by the line 11—11 of Figure 6, Figure 12 is a similar view taken substantially as indicated by the line 12—12 of Figure 6.

Figure 13 is a sectional view of a modified brake mounting, parts being shown in elevation, and, Figure 14 is a development of the cam shown in Figure 13.

Referring to the drawings, the numeral 10 designates an automobile chassis as a whole having side frames 11 supported by the usual wheels 13. A power plant is supported by the vehicle frame and includes a motor 14 through which cooling liquid is circulated in the usual manner. The system for the cooling liquid includes the usual radiator 15 having an inlet connection 16 and an outlet connection 17, the latter leading to the intake side of a water pump 18. The top of the radiator is provided with the usual overflow pipe 19 and it is through this pipe that the water in the circulating system remains at all times under atmospheric pressure.

The motor 14 is provided with the usual clutch 20 through which power is delivered through a transmission 21 to a driven shaft 22, and this shaft transmits power to a propeller shaft 23 by means of a universal connection 24. A similar universal connection 25 transmits power from the propeller shaft to the differential 26 by means of which the traction wheels of the vehicle are driven in the usual manner.

A fluid friction brake indicated as a whole by the numeral 27 is indicated as being connected in the driven shaft 22. The brake will be described in detail later together with its connection in the shaft 22 and it will become apparent that the brake may be driven from any suitable part of the apparatus which rotates with or by virture of the rotation of the driven shaft 22. As will be described in detail later, the fluid friction brake is provided with a fluid intake 28 to which is connected one end of a pipe 29, the other end of this pipe being tapped into the liquid circulating system of the vehicle at any point as, for example, in the pipe 17 leading to the intake side of the pump 18. The brake 27 is likewise provided with an outlet 30 which may be connected by a pipe 31 to the connection 16. As will become apparent, braking fluid circulates through the brake 27 and passes therefrom through the pipe 31 for delivery through the engine cooling system, and a check valve 32 is arranged in the pipe 31 to prevent reverse or surging movement of the braking liquid.

In the installation shown in Figure 3 a somewhat modified circulating system for the brake has been illustrated. In such form of the invention, the outlet 30 of the brake is connected to a pipe 33 leading to a separate radiator 34 which may be arranged in any suitable position, for example, in the position shown in Figure 3, rearwardly of the conventional vehicle radiator. The radiator 34 also may be provided with an overflow pipe 35, and accordingly the circulating system for the brake contains liquid under atmospheric pressure. A non-return valve 36 may be provided in the pipe 35, as will be apparent. The radiator 34 is connected by a pipe 37 to an auxiliary storage tank 38, and this tank, in turn, is connected by a pipe 39 to the brake inlet 28. The tank 38 is provided merely to increase the liquid capacity of the system, if desired, and its use is not essential.

A further modified braking system is illustrated in Figure 4 wherein the outlet 30 of the fluid friction brake is connected to the top of the radiator 15, or a similar point, by a pipe 40 preferably provided with a non-return valve 41. A pipe 42 leads to the brake inlet 28 and is connected to the bottom of the radiator 15. If desired, an auxiliary liquid storage tank 43 may be arranged in the pipe 42 to increase the liquid capacity of the system.

In the system shown in Figure 4 means are provided for assisting in the complete evacuation of liquid from the brake and for synchronizing such operation with the brake control mechanism. The brake is provided at the bottom thereof with a drain connection 44 to which is connected a pipe 45 leading to a cut off valve 46. This valve is connected by a pipe 47 to the pump intake pipe 17 and is preferably provided with a non-return valve 48 to prevent the flow of liquid from the pipe 47 into the bottom of the brake. The valve 46 is provided with an operating lever 49 to the other end of which is pivotally connected one end of a link 50. The other end of this link is pivotally connected to an arm 51 carried by a shaft 52 which is adapted to be partially rotated to control the braking action in a manner to be described.

The brake 27 preferably is of one of the types disclosed in my copending applications Serial Nos. 61,231 and 63,240, referred to above, and the brake mechanism of the former application has been illustrated in the drawings. Referring to Figures 6, 7 and 8 the brake 27 comprises a casing indicated as a whole by the numeral 53 made up of a central section 54 and outer sections 55 secured thereto as at 56. The central casing section is provided with laterally projecting arms 57 bolted to the vehicle frame members 11 as at 58, rubber blocks or similar cushions 59 preferably being interposed between the ends of the arms 57 and the frame members 11.

A shaft 60 extends through the brake housing and forms, in effect, a part of the driven shaft 22, being coupled therein as at 61. The arrangement of the shaft 60 as a part of the driven shaft forms one convenient means for driving the brake, but it will be obvious that the shaft 60 may be otherwise driven. For example, it may be driven by the propeller shaft 23.

A rotor 62 is keyed as at 63 to the shaft 60 and is concentric therewith. However, the axis of the shaft 60 is preferably arranged slightly above the axis of the casing 53, and accordingly the rotor 62 is slightly eccentric with respect to the casing. Thus the clearance between the rotor and the bottom of the casing is slightly greater than the clearance between the rotor and the top of the casing, and this arrangement facilitates the pumping action of the rotor, as will become apparent. The rotor is provided in its periphery with a plurality of pockets 64 to generate a pumping action and thus move liquid in the casing toward a discharge opening 65 formed in the outlet connection 30. This being true, it necessarily follows that the pockets 64, in themselves, constitute means for effecting a flow of fluid into the brake, since the discharging of fluid from the brake must result in a like flow of fluid into the brake.

The rotor 62 is provided in opposite faces with pockets 66 divided by vanes 67 as shown in Figures 8 and 9 and communicating with similar pockets 68 formed in the inner faces of stator members 69. The stator members are threaded into the central casing section 54 as at 70 (Figure 6) and have their inner faces arranged as close as practicable to the outer faces of the rotor 62. Obviously the pockets 68 are also formed between vanes 71 formed integral with the stator members 69 and having their inner edges flush with the inner faces thereof. Each casing section 55 is provided with a shoulder 72 engaging against one of the stators to positively retain it in position. It will be apparent that the coacting pockets 66 and 68 incline away from the center of the rotor in the direction of rotation of the latter as shown in Figures 11 and 12, and they may be substantially radially arranged as indicated in dotted lines in Figure 10.

Each casing section 55 is provided with suitable packing 73 to eliminate leakage of the braking liquid along the shaft 60. Each packing is retained by a gland 74 which is engageable by a retaining ring 75 carrying anti-friction bearing 76, as shown in Figure 6. These bearings as well as the packing 73 may be supplied with lubricant in any suitable manner.

Each casing section 55 is provided in its inner face with an annular liquid passage 77. At one point in its periphery the central casing section is provided with means for introducing braking liquid into the passages 77. Referring to Figures 7 and 10 the numeral 78 designates a valve casing secured to the casing section 54 and connected to the fluid inlet pipe 29 through which the braking liquid is supplied to the passages 77.

The pipes 29 and 31 obviously are connected to the radiator 15, which functions in the usual manner as a reservoir for the circulating liquid and as a heat exchanger therefor. As is well known, hydrodynamic brakes develop a substantial degree of heat in the braking liquid, and circulation of liquid through the brake is maintained in a manner to be described. The circulating system for the brake includes the radiator 15, by means of which heat generated in the brake is dissipated.

The valve casing 78 is secured to the casing 54 as at 79. A portion of the casing 78 projects through an opening 80 in the casing section 54 and terminates in a valve seat 81. A valve 82 engages this valve seat and is carried by a guide 83 slidable in the valve casing 78.

Means are provided for controlling the admission of braking liquid from the passages 77 into the rotor and stator pockets, and for governing the discharge of liquid from such pockets back to the passages 77. Each stator is provided with a plurality of inlet tubes 84, and in Figure 12 of the drawings every other stator pocket 68 is shown as being provided with such a tube. As indicated in Figures 6 and 7, the inlet tubes have their longitudinally inner ends inclined radially outwardly with respect to the axis of the brake, and these ends of the inlet tubes are also inclined in the direction of rotation of the rotor, as indicated in Figure 12.

A plurality of discharge ports 85 is provided in each stator member and such ports communicate with certain of the pockets 68 adjacent the radially outer ends thereof as shown in Figure 6. A discharge port has been shown for every other pocket 68, but it will be obvious that any desired number of these ports may be used. It will be noted that the ports 85 are located at the sides of the pockets 68 in the direction of rotation of the rotor (Figure 11) and the discharge ports are thus placed in a position directly in alinement with the flowing liquid when the brake is in operation, as will become apparent.

A valve disk 86 is arranged against the outer face of each stator 69. Each valve disk is provided with ports for governing communication through the tubes 84 and ports 85, and the tubes 84 are progressively closed as the ports 85 are progressively opened, and vice versa. As will become apparent, therefore, the amount of effective braking liquid may be readily controlled.

Each valve disk 86 is provided with a plurality of sets of ports differing in length from each other. For example, three inlet ports may comprise the set, as shown in Figures 10 and 12, the first port of the set being indicated by the numeral 87 and being the shortest port. The next longest port of each set is indicated by the numeral 88 and the longest port by the numeral 89. In the position of the valve disk 86 in Figure 10, it will be apparent that communication to all of the inlet tubes 84 is closed, and under such conditions all of the discharge ports 85 are open. It further will be apparent that upon initial rotation of the valve disks 86 in a counter-clockwise direction, as viewed in Figure 10, each port 89 will almost immediately come into communication with one of the inlet tubes 84. Upon further rotation of the valve disks, the inlet ports 88 will communicate with their respective tubes 84, and upon still further rotation of the valve disks, the remaining inlet tubes 84 will be opened to communication to the passages 77 through the inlet ports 87.

Each valve disk is further provided with a plurality of sets of discharge ports for governing communication through the stator ports 85. As shown in Figures 10 and 11, each set of discharge ports comprises a relatively short port 90, a somewhat longer port 91 and a still longer port 92. The three discharge ports of one set are shown at each side of Figure 11 in communication with their respective stator ports 85, the disk valves 86 in such case occupying the same position as in Figures 10 and 12 wherein the inlet ports 87, 88 and 89 are indicated as being closed. Referring to Figure 11, it will be apparent that upon movement of the valve disks toward the right, corresponding to counter-clockwise rotation of the valve disks in Figure 10, the ports 90 will first move out of registration with their corresponding ports 85, after which the ports 91 will close their corresponding ports 85, followed upon further movement of the valve disks by the closing of the remaining ports 85 through the ports 92. Conversely, opposite movement of the valve disks will progressively and successively open the ports 85 through the successive ports 92, 91 and 90 in the order named.

Each valve disk rotates about one of the shoulder portions 72 of one of the casing sections 55, and each disk is provided with a peripheral flange 93 in a portion of which is formed a segment gear 94. The control shaft 52, previously described, is provided with an enlarged portion 95 journaled in a boss 96 forming a part of the casing section 54. Pinions 97 are carried by the shaft 52 and mesh with the respective segment gears 94, and the shaft extends laterally through one of the casing sections 55 through a packing gland 98. The shaft 52 extends to any suitable control point and may be manually rotated in any desired manner to transmit rotary movement to the valve disks.

Each valve disk is provided with an outstanding annular portion 99 having an annular groove 100 therein receiving a pressure ring 101 for retaining the valve disks against the outer faces of the stators. Each pressure ring is provided at spaced points with pins 102 slidable in the casing sections 55, and a spring 103 surrounds each pin 102 to urge the associated pressure ring 101 inwardly.

The inlet valve 82 is governed in accordance with the operation of the valve disks 86. Referring to Figure 7, the numeral 104 designates a leaf spring having a flat free end portion 105 engaging the valve 82. The other end portion 106 of the spring is pivotally connected as at 107 to one of the pressure rings 101. The leaf spring is engageable by a cam 108 to move the valve 82 to closed position, the cam being shown in Figure 9 as having a sloping cam face 109 for moving the adjacent portion of the spring 104 toward the right as viewed in Figure 7. The cam 108 is preferably formed integral with the adjacent valve disk 86, and the movement of the spring under the influence of the cam flexes it intermediate its ends to maintain a substantial pressure against the valve 82 to hold the latter firmly seated.

In the form of the invention described, the rotor is secured to the shaft which extends through the brake structure and accordingly is constantly driven by some rotating part of the vehicle. As will become apparent, the brake is adapted to be rendered inoperative by being evacuated of liquid, and in Figure 13 of the drawings a modified form of brake structure is illustrated wherein the rotor may remain stationary while the brake is inoperative. In such construction, the brake may be mounted in the same position as the brake structure shown in Figure 1, although such specific arrangement is not necessary.

Referring to Figure 13, the numeral 110 designates a shaft extending through the brake structure, and such shaft may be the driven shaft extending rearwardly from the transmission. This shaft, however, is not secured to the rotor of the brake and the latter is driven by the shaft 110 only when the brake is in operation. The brake structure as a whole illustrated in Figure 13 may be of the type previously described and need not be referred to in detail. Instead of the rotor 62 as in the previously described form of the invention, a rotor 111 is employed which may be the same as the rotor referred to except that it is provided with an integral sleeve portion 112 rotatably surrounding the shaft 110. In all other respects the rotor 111 may be identical with that previously described. The sleeve 112 is provided at one end with a clutch element 113 keyed thereto as at 114.

A coacting clutch element 115 is splined on the shaft 110 as at 116. An operating lever 117 is provided for axially moving the clutch element 115 and is forked at its lower end for engagement with an annular groove 118 formed in the clutch element 115. The lever 117 is pivotally connected intermediate its ends as at 119 to a suitable bracket 120. The brake is provided with the same operating shaft 52 as in the previously described form of the invention, and such shaft is provided with a cam collar 121 having a cam groove 122 therein. This groove is engageable by a pin 123 carried by the upper end of the lever 117, as will be apparent. The cam groove is provided with a sloping portion 124 which communicates with a portion 125 arranged at right angles to the axis of the shaft 152. When the brake is inoperative the pin 123 is arranged in the end of the sloping cam groove portion 124 remote from the groove portion 125, and the pins are arranged at some point in the cam groove portion 125 when the brake is in operation, depending upon the degree to which the brake is in operation.

The operation of the brake per se as illustrated in Figures 6 to 12 inclusive is as follows:

It will be apparent that the shaft 60 rotates at all times during the movement of the vehicle since it is connected to be driven from the shaft 22 or some portion of the vehicle which rotates at all times during rotation of the driving wheels. Assuming that the brake is not functioning to retard the vehicle speed, the means for controlling the flow of braking liquid through the brake will occupy the positions shown in Figures 6, 10, 11 and 12. Under such conditions the valve disks 86 will retain all of the inlet tubes 84 closed as shown in Figures 6, 10 and 12, while all of the ports 85 of the stator pockets will be open to communication with the annular passages 77, as shown in Figures 6 and 11. At the same time, the inlet valve 82 will be closed, and accordingly the rotor 62 will be freely rotatable while the rotor and stator pockets will remain completely emptied of braking liquid.

The operator may render the brake operable for retarding the movement of the vehicle by rotating the shaft 52 through suitable means provided for this purpose adjacent the driver's seat. Counter-clockwise rotation as viewed in Figure 10 is imparted to the valve disks 86 and toward the right as viewed in Figures 11 and 12. At the beginning of such movement, the inlet ports 89 will move into communication with their respective inlet tubes 84 while the ports 90 will be progressively closed to communication with the outlet ports 85. Further movement of the valve will open communication between the inlet ports 88 and their associated inlet tubes 84 while the ports 91 will be closed to their associated ports 85, and still further rotating movement of the valve disks opens the remaining inlet tubes 84 through the ports 87, while the remaining outlet ports 85 will be closed to communication through the ports 92. At the beginning of the valve movement the pivoted end of the spring 104 (Figures 7 and 8) will have been arranged in engagement with the high point of the cam 108, and as movement of the valve disks progressively takes place in the manner described, the sloping cam face 109 moves with respect to the spring 104, thus releasing the valve 82 for movement to open position. All of the movements described take place progressively and accordingly the braking action may be progressively increased from zero to maximum, and any desired intermediate braking action may be obtained by stopping the rotation of the shaft 52 at an intermediate point.

The arrangement of the inlet tubes 84 is such that the action of the rotor induces a flow of liquid from the passages 77 into the rotor pockets 66, this action being due to the centrifugal force generated in the body of the fluid in the rotor pockets and the inclination of the tubes 84. By adjusting communication through the inlet tubes 84 and simultaneously adjusting communication through the outlet ports 85, a point readily may be reached wherein the operator may retain within the rotor and stator pockets the proper amount of fluid to provide the desired braking action under any particular condition.

In this connection it will be noted that the ports 92 remain in communication with their associated ports 85 beyond the movement of the ports 90 and 91 across their ports 85, and similarly the ports 91 remain in communication with their ports 85 beyond the movement of the ports 90 across their associated ports 85. The same is true of the operation of the ports 87, 88 and 89 with respect to the inlet tubes 84 and accordingly it will be apparent that one, two or three ports of very set of ports may be opened or closed at any time. Consequently, any desired quantity of fluid may be contained in the brake to provide the desired braking action, the maximum amount of fluid being present in the brake when all of the outlet ports are closed and all of the inlet ports are open.

Thus the shaft 52 (Figures 6 and 10) constitutes operating means for governing the flow of braking liquid through the brake, such shaft forming common means for controlling the admission of fluid into the brake and the discharging of the fluid therefrom. While the valve disks 86 form means for controlling the fluid circulation through the brake, it is desirable that the inlet valve 82 may be provided to control the admission of fluid into the passages 77. Such valve also is controlled by operation of the shaft 52.

Referring to Figure 9 it will be noted that the spring 104 will be engaged by the cam face 109 adjacent the high point thereof when the brake is completely inoperative, under which conditions the valve disks and their ports occupy the positions shown in Figures 11 and 12. Upon operation of the valve disks to render the brake operative, the cam face 109 will progressively release the spring 104, permitting it to move to the solid line position shown in Figure 7 with the valve 82 fully open. Obviously, this valve occupies intermediate positions under the control of the operator, the position of the valve being directly related to the positions of the valve disks 86, depending upon the degree to which the brake is rendered operative.

The hydrodynamic brake elements per se, comprising the rotor 62 and stators 69 function as fully described in my prior Patents Nos. 1,992,910 and 1,992,911 issued February 26, 1935. The rotor generates centrifugal force in the fluid pockets 66 to create a radial flow of the fluid to the radially outer portions of the rotor pockets, whereupon the fluid is discharged into the radially outer portions of the pockets 68 of the stator members. The latter pockets being stationary, it will be apparent that they overcome the inertia of the liquid and react therethrough to retard the rotational speed of the rotor.

The fluid flows radially inwardly through the stator pockets and then is discharged into the corresponding ends of the rotor pockets. The vanes between the latter pockets cut through the flowing fluid and substantial energy is required for again setting this fluid into rotary motion. This energy is absorbed from the rotor, thus further tending to retard the rotational speed thereof. The degree to which the braking action takes place depends upon several elements, such as the total amount of fluid in operation between the rotor and stator pockets and the speed of rotation of the rotor. Any desired braking action between zero and a given maximum for a given vehicle speed may be accomplished by governing the amount of fluid contained within the rotor and stator pockets in the manner described. The braking action, of course, will increase upon the increased speed of rotation of the shaft 18, it being well known that in a brake of this type the braking action increases as the square of the speed of rotation of the rotor.

The energy absorbed in effecting the braking action is transformed into heat in the body of the braking liquid and it is desirable to maintain a circulation of liquid through the brake and to dissipate the generated heat. In the normal operation of the brake, leakage occurs radially outwardly between the adjacent faces of the rotor and stator and the liquid flows into the space around the periphery of the rotor. The pockets 64 tend to cause the liquid referred to to rotate at the same speed as the rotor, thus creating centrifugal force in the body of the rotating liquid to discharge it through the opening 65 (Figure 8) from whence it flows through the pipe 31 and through the particular heat interchanging means being employed.

The pockets 64 constitute means within the brake and forming a part of the rotor for effecting the flow of liquid into and out of the brake so that the fluid within the brake may be relatively cool at all times. The pocket means referred to also constitutes means for evacuating the brake when the latter is inoperative, as will become apparent. The slight eccentricity of the rotor with respect to the casing section 54 is such as to place the braking liquid under pressure as it approaches the discharge opening 65, thus increasing the effectiveness of the pockets 64 as pumping means for discharging liquid from the brake.

As previously stated, the valve disks occupy the positions shown in Figures 6, 10, 11 and 12 when the brake is inoperative, the valve 82 under such conditions being maintained in closed position by the cam face 109. Thus there can be no flow of liquid into the brake, and the opening of the ports 85 (Figure 6) to the passages 77 maintains the rotor pockets 66 completely evacuated. Liquid remaining in the pockets 77 tends to flow inwardly through the openings 85 but cannot flow into the rotor pockets 66 because of the rotation of the rotor, and such rotational movement sets up a rotary action in the liquid coming into contact with the rotor, and such liquid is gradually completely evacuated by flowing radially outwardly between the rotor and stator members.

It will be apparent that each form of circulating system illustrated (Figures 1 to 4 inclusive) is in communication with the atmosphere, and accordingly the various pockets of the passages of the brake structure are vented to the atmosphere. Thus the creation of a partial vacuum in the brake structure incident to the evacuation of liquid therefrom is prevented and evacuation is completely carried out. The brake per se illustrated in Figure 13 is identical with that described and need not be referred to in detail. However, the rotor is not positively driven by the shaft 110 as is true in the case of the form previously described, and complete evacuation of the brake accordingly is of less importance. The rotor 111 is freely rotatable with respect to the shaft 110. The various valve devices within the brake are controlled by the shaft 52 in the manner previously described, and when the brake is inoperative, the pin 123 is located in the angular cam groove 124 remote from the end portion 125 of the cam groove. Under such conditions, the clutch elements 113 and 115 are released from each other and the rotor 111 is permitted to remain stationary.

When the brake is to be rendered operative, the shaft 52 is rotated, and accordingly the pin 123 is moved toward the left as viewed in Figures 13 and 14 to engage the clutch element 115 with the element 113. Under such conditions the rotor 111 will rotate with the shaft 110, whereupon continued rotation of the shaft 52 will control the degree of braking action in the manner described. Since the cam groove portion 125 lies in a plane at right angles to the axis of the shaft 52, rotation of this shaft after clutch engagement takes place does not affect the clutch in any manner, the clutch remaining engaged during all adjusted positions of the brake controlling valve devices. When the brake is to be rendered inoperative, rotation of the shaft 52 is reversed to restore the normal position of the valve devices within the brake and to release the clutch elements 113 and 115 from each other. Under such conditions, the rotor 111 will remain stationary and the presence of any liquid retained in the brake cannot affect the condition of inoperativeness of the brake.

The brake structures described are particularly adapted for use with the forms of liquid circulating systems shown in Figures 1 to 4 inclusive. In Figures 1 and 2 of the drawings, the outlet opening 65 of the brake is connected to the pipe 31 and the inlet of the brake is supplied with liquid through the pipe 29. During the operation of the brake, a circulation of liquid is maintained through the brake in the manner described, the liquid pumped from the brake flowing through the pipe 31 to be discharged into the radiator 15 through the connection 16, and water is continuously supplied to the brake at the same rate through the pipe 29. Thus the radiator or heat exchanger 15 constitutes the means for dissipating heat generated during the braking action. Attention is particularly invited to the fact that the self-contained circulating feature of the brake permits the inlet pipe 29 to be connected at the intake side of the vehicle circulating pump 18. This feature is of particular importance since it will be apparent that the pump 18 continues under all conditions to maintain the necessary circulation of cooling liquid through the vehicle engine. Accordingly proper cooling of the vehicle engine takes place regardless of the length of time during which the brake 27 remains in operation. The pumping action created by the induction of liquid into the rotor pockets 66 is sufficient to overcome the slight reduction in pressure present adjacent the intake side of the pump 18 whereby the proper flow of liquid into the rotor pockets is maintained.

In the form of the invention shown in Figure 3 the inlet and outlet of the brake are connected respectively to the pipes 39 and 33 and a separate cooling system for the brake is provided. Such system includes the separate radiator or heat exchanger 34, and further includes the use of an auxiliary storage tank 38 to increase the capacity of the liquid in the system to any desired point.

The system illustrated in Figures 4 and 5 differs from the form shown in Figures 1 and 2 principally in that it provides novel means for assisting in the evacuation of the brake. Liquid is supplied to the inlet of the brake through pipe 42, leading from the bottom of the radiator 15, and liquid discharged from the brake flows to the radiator through the pipe 40. The braking action is controlled in the manner described by rotation of the shaft 52, as will be apparent. In addition to the evacuation of the brake in the manner described, the brake is provided with a drain pipe 45. The pipe 45 is closed by the valve 46 when the brake is in operation, and under such conditions, a liquid circulation is maintained through the brake in the manner previously described. The braking action is controlled by the shaft 52 which may be rotated to the desired position to provide any braking action between zero and the maximum for a given vehicle speed.

In accordance with the previously described operation, the brake will be evacuated when the shaft is turned to a position to render the brake inoperative. The pipe 45, under such conditions, functions to provide a more rapid complete evacuation of the brake. When the shaft 52 is rotated to the position in which the brake is rendered completly inoperative, the valve 46 opens the pipe 45 to communication with the pipe 47 which leads to the intake side of the pump. Since a pressure somewhat below that of the atmosphere is maintained at the intake side of the pump, it will be apparent that the latter functions when the valve 46 is opened to quickly and completely evacuate the brake 27, the liquid flowing through the drain connection 44 at the bottom of the brake casing. The system illustrated in Figures 4 and 5 is particularly adapted for use with the brake structure shown in Figures 7 to 10 inclusive wherein the rotor is connected for constant rotation during rotation of the vehicle wheels. Such system functions to almost immediately evacuate the brake when the latter is rendered inoperative instead of requiring the short interval of time which is required for the evacuation of the brake in the absence of the drain means referred to.

It will be apparent that in each of the systems referred to the liquid in the system is influenced by atmospheric pressure through the medium of the overflow pipes 19 or 35 through which the radiators are vented to the atmosphere. The presence of atmospheric pressure permits the pumping means of the brake to function against negligible back pressure and permits the brake to be completely evacuated by preventing the creation of a partial vacuum within the brake when the latter is rendered inoperative. In each case a single control shaft is provided through which all of the functions of the brake may be controlled, and any desired braking action between zero and maximum may be quickly and easily obtained. In this connection it is pointed out that the brake structures as described are particularly adapted for use with heavy trucks and buses for limiting the speed thereof, but are not intended to supplant the conventional friction brakes. The latter brakes are intended to be used for bringing a vehicle to a stop, but the brake structures described are particularly advantageous for limiting the speeds of heavy vehicles when descending long grades thus permitting the conventional friction brakes to be employed almost solely for stopping the vehicle. In descending a long grade it is not necessary to employ the friction brakes, and accordingly such brakes are saved from the excessive wear to which they ordinarily are subjected.

Where the conventional cooling system of a motor vehicle is employed as a part of the circulating system for the brake, it is desirable to connect the intake pipe of the brake to some point other than the outlet side of the conventional circulating pump in order that the brake may be prevented from interfering with the normal circulation of liquid through the motor vehicle engine. In the form of the invention shown in Figures 1 and 2, the brake inlet pipe 29 is shown as being connected adjacent the inlet side of the pump 18, whereas in Figure 4 the corresponding pipe has been indicated as being connected to the bottom of the radiator 15. In either case the pumping means embodied in the brake maintains the desired and necessary circulation of liquid therethrough without depending on the pump 18 for such circulation. The point in the system at which the inlet pipe for the brake is tapped into the engine cooling system is immaterial so long as the connection is made at some point other than betwen the pump 18 and the engine 14. Where the claims refer to the connection of the brake inlet at the intake side of the pump, therefore, it is understood that this expression is intended to mean that the brake inlet pipe is connected in the engine circulating system at some point not influenced by the pressure generated by the pump 18.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A braking system for a motor vehicle having an engine provided with a cooling fluid circulating system communicating with the atmosphere and providing a fixed path for the circulation of cooling fluid around the engine, a fluid friction brake, fluid connections for said brake including inlet and outlet conduits connected to said circulating system, means forming a part of said brake for circulating fluid therethrough, and means for evacuating fluid from said brake.

2. A braking system for a motor vehicle having an engine provided with a cooling fluid circulating system including a circulating pump, a fluid friction brake, and fluid circulating connections for said brake including a fluid inlet conduit for the brake connected to said circulating system adjacent the intake side of said pump.

3. A braking system for a motor vehicle having an engine provided with a cooling fluid circulating system including a circulating pump, a fluid friction brake, means for circulating fluid through said brake, and fluid circulating connections for said brake including a fluid inlet conduit for the brake connected to said circulating system adjacent the intake side of said pump.

4. A braking system for a motor vehicle having an engine provided with a cooling fluid circulating system including a circulating pump, a fluid friction brake, means arranged within said brake for circulating fluid therethrough, and fluid circulating connections for said brake including a fluid inlet conduit for the brake connected to said circulating system adjacent the intake side of said pump.

5. A braking system for a motor vehicle having an engine provided with a cooling fluid circulating system including a circulating pump, a fluid friction brake, means forming a part of said brake for circulating fluid therethrough, and fluid circulating connections for said brake including a fluid inlet conduit for the brake connected to said circulating system adjacent the intake side of said pump.

6. A braking system for a motor vehicle having an engine provided with a cooling fluid circulating system including a circulating pump, a fluid friction brake including rotor and stator elements, fluid circulating connections for said brake including a fluid inlet conduit for the brake connected to said circulating system adjacent the intake side of said pump, and means carried by said rotor element for continuously discharging fluid from said brake.

7. A braking system for a motor vehicle having an engine provided with a cooling fluid circulating system including a circulating pump, a fluid friction brake including rotor and stator elements, fluid circulating connections for said brake including a fluid inlet conduit for the brake connected to said circulating system adjacent the intake side of said pump, and means for effecting a flow of fluid into said brake.

8. A braking system for a motor vehicle having an engine provided with a cooling fluid circulating system including a circulating pump, a fluid friction brake including rotor and stator elements, fluid circulating connections for said brake including a fluid inlet conduit for the brake connected to said circulating system adjacent the intake side of said pump, and means for effecting a flow of fluid through said inlet conduit to the brake against the resistance incident to the relative reduction in pressure present at the intake side of said pump.

9. A braking system for a motor vehicle having an engine provided with a cooling fluid circulating system including a circulating pump, a fluid friction brake including rotor and stator elements, fluid circulating connections for said brake including a fluid inlet conduit for the brake connected to said circulating system adjacent the intake side of said pump, means for effecting a flow of fluid into said brake, and means within said brake for continuously discharging fluid therefrom.

10. A braking system for a motor vehicle having an engine provided with a cooling fluid circulating system including a circulating pump, a fluid friction brake including rotor and stator elements, fluid circulating connections for said brake including a fluid inlet conduit for the brake connected to said circulating system adjacent the intake side of said pump, means for effecting a flow of fluid through said inlet conduit to the brake against the resistance incident to the relative reduction in pressure present at the intake side of said pump, and means for maintaining a continuous discharge of fluid from said brake.

11. A braking system for a motor vehicle having an engine provided with a cooling fluid circulating system including a circulating pump having an intake, a fluid friction brake having a fluid outlet connected to said circulating system, and means within said brake for inducing a flow of fluid thereinto from said pump intake against the resistance offered by the relatively reduced pressure therein.

12. A braking system for a motor vehicle having an engine provided with a cooling fluid circulating system including a circulating pump having an intake, a fluid friction brake having a fluid outlet connected to said circulating system, means within said brake for inducing a flow of fluid thereinto from said pump intake against the resistance offered by the relatively reduced pressure therein, and means for effecting a continuous discharge of fluid from said brake to said circulating system.

13. A braking system comprising a fluid friction brake, means for circulating fluid through said brake, means for controlling the effective braking action of said brake, and means operative when said controlling means reduces the effective braking action to a predetermined point for clearing said brake of fluid.

14. A braking system comprising a fluid friction brake, means for circulating fluid through said brake, means for controlling the effective braking action of said brake, a fluid drain connection for said brake, a valve in said connection, and means for opening said valve when said controlling means reduces the effective braking action to a predetermined point.

15. A braking system comprising a fluid friction brake, means for circulating fluid through said brake, means for controlling the effective braking action of said brake, an operating shaft for said controlling means, and means for clearing said brake of fluid when said operating shaft is moved to reduce the effective braking action to a predetermined point.

16. A braking system comprising a fluid friction brake, means for circulating fluid through said brake, means for controlling the effective braking action of said brake, an operating shaft for said controlling means, a fluid drain connection for said brake, a valve in said connection, and means connecting said shaft to said valve to open the latter when said shaft is moved to reduce the effective braking action to a predetermined point.

17. A braking system for a motor vehicle having an engine provided with a cooling fluid circulating system including a circulating pump, a fluid friction brake, means for controlling the effective braking action of said brake, and fluid drainage means for connecting said brake to said circulating system adjacent the intake side of said pump when said controlling means reduces the effective braking action to a predetermined point.

18. A braking system for a motor vehicle having an engine provided with a cooling fluid circulating system including a circulating pump, a fluid friction brake, means for controlling the effective braking action of said brake, a fluid drain connection leading from said brake to said circulating system adjacent the intake side of said pump, a valve in said drain connection, and means for opening said valve when said controlling means reduces the effective braking action to a predetermined point.

19. A braking system comprising a fluid friction brake, a fluid circulating system for said brake, a pump operative for draining fluid from said brake, means for governing the effective braking action of said brake, and means for rendering said pump effective for draining fluid from said brake when said governing means reduces the effective braking action to a predetermined point.

20. A braking system comprising a fluid friction brake, a fluid circulating system for said brake, a fluid drain connection for said brake, a pump operative for draining fluid through said connection, a valve in said connection between said brake and said pump, means for controlling the effective braking action of said brake, and means for opening said valve when said controlling means reduces the effective braking action to a predetermined point.

21. The combination with a rotary shaft, of a fluid friction brake including a rotor freely rotatable independently of said shaft, constantly operating means tending to supply fluid to said brake, means for controlling the admission of fluid to said brake, and means operative in conjunction with said controlling means for driving said rotor with said shaft.

22. The combination with a rotary shaft, of a fluid friction brake including a rotor freely rotatable independently of said shaft, constantly operating means tending to supply fluid to said brake, means for controlling the admission of fluid to said brake, clutch means for connecting said rotor to said shaft to be driven therewith, and means operative in conjunction with said controlling means for rendering said clutch means operative and inoperative.

23. The combination with a rotary shaft, of a fluid friction brake including a rotor freely rotatable independently of said shaft, constantly operating means tending to supply fluid to said brake, means for controlling the admission of fluid to said brake to govern the effective braking action of said brake, and means operative in conjunction with said controlling means for effecting rotation of said rotor with said shaft when said brake is operative.

24. The combination with a rotary shaft, of a fluid friction brake including a rotor freely rotatable independently of said shaft, constantly operating means tending to supply fluid to said brake, means for controlling the admission of fluid to said brake to govern the effective braking action of said brake, and means operative by said controlling means for effecting rotation of said rotor with said shaft prior to the generation of a substantial degree of braking action in said brake.

25. The combination with a rotary shaft, of a fluid friction brake including a rotor freely rotatable independently of said shaft, constantly operating means tending to supply fluid to said brake, means for controlling the admission of fluid to said brake to govern the effective braking action of said brake, clutch means for connecting said rotor to said shaft to be driven thereby, and means operated by said first named means for engaging said clutch prior to rendering said brake effective for generating substantial braking action.

26. The combination with a rotary shaft, of a fluid friction brake including a rotor, a sleeve surrounding and normally free from said shaft and connected to said rotor, a clutch including elements respectively rotatable with said shaft and said sleeve, constantly operating means tending to supply fluid to said brake, means for controlling the admission of fluid to said brake to govern the effective braking action of said brake, and means operative in conjunction with said controlling means for engaging and disengaging said clutch elements.

27. The combination with a rotary shaft, of a fluid friction brake including a rotor, a sleeve surrounding and normally free from said shaft and connected to said rotor, a clutch including elements respectively rotatable with said shaft and said sleeve, means for controlling the effective braking action of said brake, a rotatable shaft for operating said controlling means, a cam carried by said second named shaft, and an operating lever operable by said cam and connected to one of said clutch elements to effect movement thereof into engagement with the other clutch element upon rotation of said second named shaft.

28. The combination with a rotary shaft, of a fluid friction brake through which said shaft extends, said brake including a rotor having a sleeve rotatably surrounding said shaft, constantly operating means tending to supply fluid to said brake, means for controlling the admission of fluid to said brake to govern the effective braking action of said brake, and means operative in conjunction with said controlling means for connecting said sleeve to said shaft.

29. The combination with a rotary shaft, of a fluid friction brake through which said shaft extends, said brake including a rotor having a sleeve rotatably surrounding said shaft, constantly operating means tending to supply fluid to said brake, means for controlling the admission of fluid to said brake to govern the effective braking action of said brake, a clutch including a pair of elements respectively rotatable with said sleeve and said shaft, and means operative by said controlling means for moving one of said clutch elements into engagement with the other clutch element.

30. The combination with a motor vehicle power plant having a driven shaft and a cooling system providing a fixed path for the circulation of cooling fluid around the engine and including a fluid circulating pump, of a fluid friction brake, fluid connections for transmitting fluid to and from said brake, means forming a part of said brake for circulating fluid therethrough, and means independent of the operation of said cooling system for evacuating fluid from said brake.

31. The combination with a motor vehicle power plant having a driven shaft and a cooling system providing a fixed path for the circulation of cooling fluid around the engine and including a fluid circulating pump, of a fluid friction brake, fluid connections for said brake including inlet and outlet conduits connected to said circulating system, and means independent of the operation of said cooling system for evacuating fluid from said brake.

32. The combination with a motor vehicle power plant having a driven shaft and a cooling system providing a fixed path for the circulation of cooling fluid around the engine and including a fluid circulating pump, of a fluid friction brake, fluid connections for said brake including inlet and outlet conduits connected to said circulating system, means forming a part of said brake for circulating fluid therethrough, and means independent of the operation of said cooling system for evacuating fluid from said brake.

33. The combination with a motor vehicle power plant having a driven shaft and a cooling system provided with a cooling fluid circulating pump, of a fluid friction brake including a rotor and a stator having fluid pockets and being constructed and arranged to induce a flow of fluid into such pockets, and a pipe from supplying fluid to said brake, said pipe being connected to said cooling system at a point where pressure in the system is not above that of the atmosphere.

34. The combination with a motor vehicle power plant having a driven shaft and a cooling system provided with a cooling fluid circulating pump, of a fluid friction brake including a rotor and a stator having fluid pockets and being constructed and arranged to induce a flow of fluid into such pockets, and a pipe for supplying fluid said brake, said pipe being connected to said cooling system at a point where pressure in the system is not above that of the atmosphere, and means operable independently of the induction of fluid into such pockets for tending to effect a continuous discharge of fluid from the brake to said cooling system.

ROBERT GRIFFIN DE LA MATER.